United States Patent
Doliwa (10) Patent No.: US 10,482,252 B2
(45) Date of Patent: Nov. 19, 2019

(54) METHOD FOR PROTECTING THE CONFIDENTIALITY AND INTEGRITY OF FIRMWARE FOR AN INTERNET OF THINGS DEVICE

(71) Applicant: NXP B.V., Eindhoven (NL)

(72) Inventor: Peter Doliwa, Hamburg (DE)

(73) Assignee: NXP B.V., Eindhoven (NL)

( * ) Notice: Subject to any disclaimer, the term of this patent is extended or adjusted under 35 U.S.C. 154(b) by 199 days.

(21) Appl. No.: 15/707,146

(22) Filed: Sep. 18, 2017

(65) Prior Publication Data

US 2019/0087577 A1 Mar. 21, 2019

(51) Int. Cl.
*H04L 29/00* (2006.01)
*G06F 21/57* (2013.01)
(Continued)

(52) U.S. Cl.
CPC ............ *G06F 21/572* (2013.01); *G06F 21/44* (2013.01); *G06F 21/602* (2013.01); *G06F 21/73* (2013.01);
(Continued)

(58) Field of Classification Search
CPC ........ G06F 21/572; G06F 21/79; G06F 21/73; G06F 21/602; G06F 21/44;
(Continued)

(56) References Cited

U.S. PATENT DOCUMENTS 9,100,189 B2 8/2015 Hartley et al.
2006/0218649 A1* 9/2006 Brickell ................ G06F 21/572
726/27
(Continued)

FOREIGN PATENT DOCUMENTS

EP 2711858 A1 3/2014
GB 2543096 A 4/2017

OTHER PUBLICATIONS

Yang et al., "Protecting Endpoint Devices in IoT Supply Chain", Proceedings of the IEEE/ACM International Conference on Computer-Aided Design, ICCAD '15, Austin, TX, USA—Nov. 2-6, (Year: 2015).*

(Continued)

*Primary Examiner* — Morshed Mehedi
(74) *Attorney, Agent, or Firm* — Daniel D. Hill (57) ABSTRACT

A method is provided for secure firmware provisioning of a device. In the method, an integrated circuit (IC) is manufactured by a first entity for use in the device. The IC is provided to a second entity for manufacturing the device using the IC. The IC has a unique identifier (UID) and secret key derivation data (KDD). A secure memory is provided to a third entity. The secure memory has a first key pair, and the secure memory is used with a firmware provisioning toolchain of the second entity. During manufacturing of the device by the second entity, the secure memory is enabled to verify the IC by verifying the UID. The secure memory stores a firmware decryption key, and is enabled to encrypt the firmware decryption key. The encrypted firmware decryption key is then provided to the IC, and the IC decrypts the encrypted firmware decryption key for use by the IC in decrypting the firmware.

16 Claims, 3 Drawing Sheets

(51) Int. Cl.
G06F 21/44 (2013.01)
H04L 9/32 (2006.01)
G06F 21/60 (2013.01)
H04W 4/70 (2018.01)
G06F 21/73 (2013.01)
G06F 21/79 (2013.01)
H04L 9/08 (2006.01)

(52) U.S. Cl.
CPC ............ *G06F 21/79* (2013.01); *H04L 9/3213* (2013.01); *H04W 4/70* (2018.02); *G06F 2221/2107* (2013.01); *G06F 2221/2115* (2013.01); *H04L 9/0838* (2013.01); *H04L 9/0894* (2013.01)

(58) Field of Classification Search
CPC .... G06F 2221/2107; G06F 2221/2115; H04W 4/70; H04L 9/3213; H04L 9/0894; H04L 9/0838
See application file for complete search history.

(56) References Cited

U.S. PATENT DOCUMENTS

| | | | |
|---|---|---|---|
| 2007/0095927 A1 | 5/2007 | Pesonen | |
| 2007/0223704 A1* | 9/2007 | Brickell | H04L 9/0841 380/281 |
| 2008/0092210 A1* | 4/2008 | Tobita | G06F 21/572 726/2 |
| 2012/0137137 A1* | 5/2012 | Brickell | G06F 21/73 713/182 |
| 2013/0163764 A1* | 6/2013 | van den Berg | H04L 9/0822 380/278 |
| 2014/0006738 A1* | 1/2014 | Nagai | G06F 21/44 711/163 |
| 2015/0095648 A1* | 4/2015 | Nix | H04W 4/70 713/170 |
| 2016/0242030 A1* | 8/2016 | Pang | H04L 9/002 |
| 2018/0097639 A1* | 4/2018 | Gulati | H04L 9/3263 |
| 2018/0152454 A1* | 5/2018 | Kwon | H04L 63/045 |

OTHER PUBLICATIONS

Guin et al., "SMA: A System-Level Mutual Authentication for Protecting Electronic Hardware and Firmware", IEEE Transactions on Dependable and Secure Computing (vol. 14 , Issue: 3 , May-Jun. 1, 2017, Date of Publication: Oct. 6, (Year: 2016).*

U.S. Appl. No. 15/377,840, Brands, Jan René, "Distributed Cryptographic Key Insertion and Key Delivery," filed Dec. 13, 2016.

* cited by examiner

METHOD FOR PROTECTING THE CONFIDENTIALITY AND INTEGRITY OF FIRMWARE FOR AN INTERNET OF THINGS DEVICE

BACKGROUND

Field

This disclosure relates generally to integrated circuits and more specifically to a method for protecting the integrity of firmware for an internet of things (IoT) device incorporating an integrated circuit (IC).

Related Art

Many Internet of Things (IoT) device manufacturers are using a manufacturing process where devices are built using standard, uncustomized, integrated circuits (ICs). The use of uncustomized ICs means the provisioning of keys for firmware integrity verification and for firmware decryption and any other security configuration steps have to take place during manufacturing. The uncustomized ICs may be delivered through distributors, and IoT device manufacturing may be outsourced to contract manufacturers. The contract manufacturers may be untrusted third parties that could take advantage of their position and overproduce devices for their own benefit or misuse the firmware or other parts for creating their own IoT devices. The question then arises how to protect the firmware that is put on the IoT device during manufacturing from misuse or extraction of secrets (firmware confidentiality protection) and how to protect the firmware from tampering (firmware integrity protection).

Typical existing solutions for firmware encryption and verifying the correct manufacturing of devices requires a permanent internet connection and provisioning servers in a secure environment. The use of provisioning servers and a permanent internet connection is not desirable because any connectivity issue or server unavailability leads to costly production stops.

Other solutions for provisioning the firmware decryption key use the same secrets for all device manufacturers and contract manufacturers or even static keys for firmware decryption. This can be very risky as one leaked or extracted key is enough to break the firmware protection for all IoT device manufacturers.

Other solutions may require the contract manufacturers to get access to the secrets owned by the device manufacturer which is not desirable because the contract manufacturer may be an untrusted third party as discussed above.

Therefore, a need exists for a method to protect the firmware during IoT device manufacturing that solves at least some of the above problems.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Generally, there is provided, a method for protecting firmware in an IoT device. In one embodiment, an integrated circuit (IC) manufacturer loads a unique identifier (UID) and secret key derivation data (KDD) onto an IC to be used in the IoT device. The IC manufacturer also prepares a manufacturer configuration parameter (MCP) and a manufacturer diversification parameter (MDP) related to the ICs being manufactured. Preferably the MCP and MDP are protected by storing them on a secure programmable device such as a smart card or a hardware security module (HSM) to protect the secret from being compromised. The prepared smartcard is provided to a device manufacturer of an IoT device that will include the IC in an IoT device. To build the IoT device, the IoT device manufacturer may outsource some or all of the production to a contract manufacturer. The IoT device manufacturer encrypts the firmware and provides the encrypted firmware to the contract manufacturer. The IoT device manufacturer adds a contract manufacturer specific key pair and a firmware decryption key to the smartcard and provides the smart card to the contract manufacturer. The contract manufacturer's provisioning toolchain, with the smartcard, verifies the IC, encrypts the firmware decryption key for the IC, and provides the encrypted firmware decryption key to the IC. The key for encrypting the firmware decryption key for the IC is a shared secret (DSS) generated by using a key agreement algorithm using the UID of the IC and the private parameters on the smartcard. The key agreement algorithm may be any key agreement algorithm, such as for example, elliptic curve Diffie-Hellman. The encrypted firmware decryption key is provided to the IC inside the IoT device. The IC receives a public unique ID (CUID) from the smartcard. The IC uses the received CUID and its own KDD to derive the same shared secret DSS that was used by the smartcard to encrypt the firmware decryption key. The IC uses the firmware decryption key to decrypt the firmware. The encrypted firmware is decrypted on the IC without any further interaction with the toolchain or the smartcard.

To provide an additional security measure for other security settings of the IoT device, such as a firmware signature verification key, that have been configured during manufacturing by the untrusted contract manufacturer, the security settings may be used as inputs into a key derivation function to derive the actual firmware decryption key from a preliminary firmware decryption key (PFDK) so that devices that are not configured correctly are not able to decrypt and run the firmware.

Also, the security settings configured during manufacturing by the untrusted contract manufacturer may be protected by using the security settings as inputs into a key derivation function used to derive an encryption key from the shared secret DSS. This way, only devices that are configured correctly are able to decrypt the firmware decryption key.

The method provides a secure approach to protect the confidentiality and integrity of firmware during manufacturing of an IoT device in an unsecure environment that uses un-customized "off-the-shelf" ICs.

In accordance with an embodiment, there is provided, a method for secure firmware provisioning of a device, the method includes: manufacturing, by a first entity, an integrated circuit (IC) for use in the device; providing the IC to a second entity for manufacturing the device using the IC, the IC having a unique identifier (UID) and secret key derivation data (KDD); and providing a secure memory to a third entity, the secure memory having a first key pair, the secure memory being used with a firmware provisioning toolchain of the second entity, wherein during the manufacturing of the device by the second entity, the secure memory being enabled to verify the IC by verifying the UID, the secure memory being enabled to store a firmware decryption key, the secure memory being enabled to encrypt the firmware decryption key, the encrypted firmware decryption key being provided to the IC, and the IC enabled to decrypt the encrypted firmware decryption key for use by the IC in decrypting the firmware. The third entity may be an internet of things (IoT) device manufacturer and the second entity may be a contract manufacturer contracted to manufacture the device for the third entity, wherein the device is characterized as being an IoT device. The method may further include: enabling storage of a preliminary firmware decryption key (PFDK) on the secure memory; enabling encrypted transfer of the PFDK to the IC from the secure memory; enabling receipt of a device configuration parameter arranged to be used as an input parameter for derivation of the firmware decryption key from the preliminary firmware decryption key on the IC; and enabling storage of the device configuration parameter inside the IC; wherein the device configuration parameter may be used in the device for one or more of storage of a firmware signature verification key (FSK), enabling or disabling a debug mode, enabling or disabling a secure boot, enabling or disabling encryption of a memory element, and enabling or disabling a modification of a device configuration. The method may further include: using the FSK to verify the firmware for the device; enabling storage of the FSK on the IC; and using the FSK as an input parameter for deriving a second firmware decryption key from the PFDK on the IC, the second firmware decryption key the same as the firmware decryption key. The method may further include: storing a device configuration parameter in the secure memory, the device configuration parameter arranged to be used for generation of a first shared secret for encrypting the firmware decryption key in the secure memory; and storing the device configuration parameter in the IC, the device configuration parameter arranged to be used for generating a second shared secret for use in decrypting the firmware decryption key in the IC. The KDD may be characterized as being an elliptic curve private key and the shared secret may be generated using elliptic curve Diffie-Hellman. Storing of the device in the IC may further include burning fuses in the IC for storing the device configuration parameter. The method may further include: using a firmware signature verification key (FSK) to verify the firmware for the device; enabling storage of the FSK on the IC and the secure memory; using the FSK as an input parameter for generating a shared secret; encrypting the firmware decryption key inside the secure memory using the shared secret to produce an encrypted firmware decryption key; and decrypting the encrypted firmware decryption key using the shared secret. The secure memory may be characterized as being one of a smartcard or a hardware security module (HSM). The method may further include: digitally signing, by the first entity, the UID to produce a signature; and enabling the secure memory to verify the UID by verifying the signature.

In another embodiment, there is provided, a method for secure firmware provisioning in a device, the method including: manufacturing, by a first entity, an integrated circuit (IC) for use in the device; providing the IC to a second entity for manufacturing the device using the IC, the IC having a unique identifier (UID) and secret key derivation data (KDD); and providing a secure memory to a third entity, the secure memory having a first shared secret generated from the UID and KDD, the secure memory being used as part of a firmware provisioning toolchain of the second entity, wherein the secure memory being used by the second entity during the manufacturing of the device to verify the IC by verifying the UID, and for encrypting a firmware decryption key using the shared secret, and wherein the firmware provisioning toolchain providing the encrypted firmware decryption key to the IC, the IC being enabled by the first entity to decrypt the encrypted firmware decryption key using a second shared secret, the second shared secret generated using a public key and the KDD, wherein the second shared secret is the same as the first shared secret, and the firmware decryption key is used for decrypting encrypted firmware in the IC. Providing the secure memory may further comprise the first entity providing the secure memory with a first key pair, wherein the first key pair includes a manufacturer configuration parameter (MCP) and a manufacturer diversification parameter (MDP), and wherein the first key pair is used to generate the shared secret. The secure memory may be enabled to receive a second key pair provided by the third entity before the secure memory is received by the second entity. The secure memory may be enabled to receive an encrypted firmware decryption key and the public key. The secure memory may be enabled to decrypt the encrypted firmware decryption key using the second key pair and the public key, the firmware decryption key being encrypted again for transfer to the IC. The secure memory may be enabled to receive and store a symmetric key for decrypting the encrypted firmware decryption key, the firmware decryption key being encrypted again for transfer to the IC. The third entity may be an internet of things (IoT) device manufacturer, the second entity may be a contract manufacturer contracted to manufacture the device for the third entity, wherein the device may be characterized as being an IoT device. The method may further include: enabling storage of a preliminary firmware decryption key (PFDK) on the secure memory; enabling encrypted transfer of the PFDK to the IC from the secure memory; enabling receipt of a device configuration parameter arranged to be used as an input parameter for derivation of the firmware decryption key from the preliminary firmware decryption key on the IC; and enabling storage of the device configuration parameter inside the IC; wherein the device configuration parameter is used in the device for one or more of storage of a firmware signature verification key (FSK), enabling or disabling a debug mode, enabling or disabling a secure boot, enabling or disabling encryption of a memory element, and enabling or disabling a modification of a device configuration. The method may further include: using the FSK to verify the firmware for the device; enabling storage of the FSK on the IC; and using the FSK as an input parameter for deriving a second firmware decryption key from the PFDK on the IC, the second firmware decryption key the same as the firmware decryption key. The UID may be determined using the KDD and a private key known only to the first entity. The secure memory may be characterized as being one of a smartcard or a hardware security module (HSM).

Figure 1:
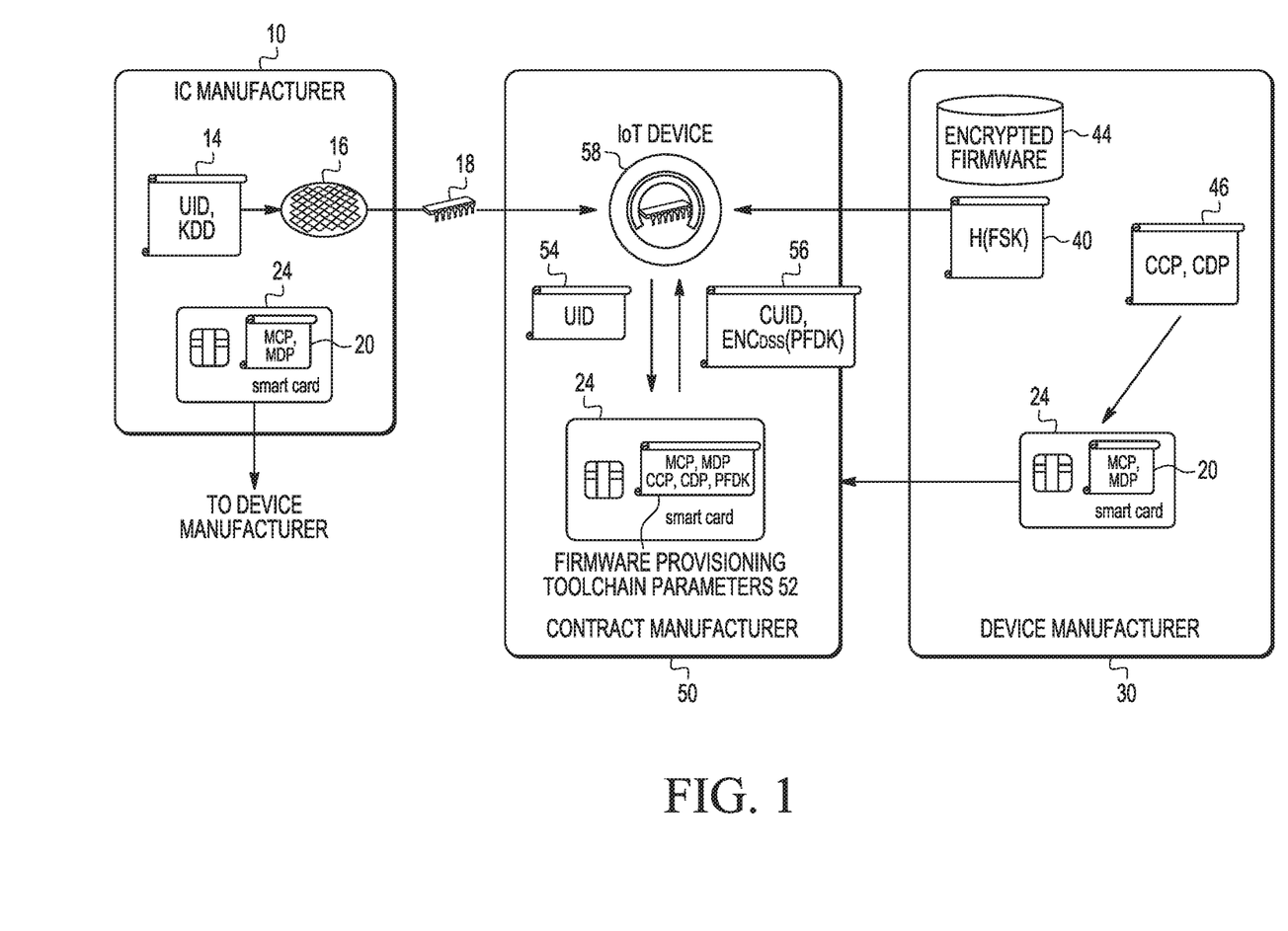
FIG. 1 illustrates a method for protecting the confidentiality and integrity of firmware of an IoT device in accordance with an embodiment.

FIG. 1 illustrates a method for protecting the confidentiality and integrity of firmware of an IoT device in accordance with an embodiment. FIG. 1 includes an IC manufacturing environment 10, a contract manufacturing environment 50, and an IoT device manufacturing environment 30. In IC manufacturing environment 10, a wafer 16 includes a plurality of IC die. The IC manufacturer inserts the initial chip-individual secret and unique identifier (UID) during, for example, wafer testing. The initial secret is used in a multi-party key agreement algorithm, such as elliptic curve Diffie-Hellman. In other embodiments, another algorithm may be used. The algorithm is used to create a shared secret securely between IC 18 and a firmware provisioning toolchain in the untrusted contract manufacturing environment 50.

A plurality of IC die are singulated from wafer 16, packaged, and tested. The ICs are not customized by the IC manufacturer, meaning that they have not been provisioned by the IC manufacturer for a particular customer. The ICs may be referred to as "off-the-shelf" ICs which may also be sold by distributors. In accordance with the method, the ICs are provided to a first entity, for example, a contract manufacturer, for inclusion in an IoT device. The contract manufacturer is contracted by an IoT device manufacturer to produce IoT devices such as IoT device 58. The ICs may be provided to the contract manufacturer directly by the IC manufacturer, by a second entity such as the IoT device manufacturer, or by another party, such as a distributor.

In addition to the ICs, the IC manufacturer also provides a secure memory 24 to the IoT device manufacturer. Secure memory 24 is a device that provides some level of security to stored contents. In one embodiment, secure memory 24 is a programmable secure device like a smartcard or a hardware security module (HSM). In the illustrated embodiment, the use of a smartcard can ensure the firmware decryption key does not leave the secure environment of the smartcard unless it is encrypted. In other embodiments, secure memory 24 may be a memory device included with software to provide a desired level of security to stored contents. As illustrated, secure memory 24 is loaded with initial secret device security configuration parameters such as a key pair including MCP and MDP. The IoT device manufacturer adds a contract manufacturer specific key pair CCP and CDP to the smartcard. The information on smartcard 24, information added by the IoT device manufacturer, and the information preloaded onto the IC by the IC manufacturer, are used to securely provision IC 18 with firmware in unsecured contract manufacturing environment 50.

The IoT device manufacturer designs IoT device 58 based on IC 18 and typically outsources the manufacturing to one or more third parties (contract manufacturers). To set up a secure firmware provisioning process, the IoT device manufacturer starts with secrets on smartcard 24. In IoT device manufacturing environment 30 the IoT device manufacturer may add a secret to the secrets provided by the IC manufacturer on smartcard 24. The additional secret may include the contract manufacturer specific key pair CCP and CDP to further diversify the resulting keys specifically for each contract manufacturer used by the IoT device manufacturer before providing it to the contract manufacturers. A hash of a firmware signature verification key (FSK) 40 and encrypted firmware 44 are delivered to contract manufacturing environment 50 by the IoT device manufacturer for uploading to each IC 18. In another embodiment, instead of the IoT device manufacturer computing key pair CCP and CDP, multiple key pairs for more than one contract manufacturer could be obtained by the IoT device manufacturer directly from the IC manufacturer. However, then the IoT device manufacturer would need to obtain updated keys from the IC manufacturer when switching contract manufacturers or when a key update is needed.

In contract manufacturing environment 50, the information on smartcard 24 is incorporated with the contract manufacturer's firmware provisioning toolchain parameters 52. The firmware provisioning toolchain may be included on smartcard 24 or on another secure memory device separate from smartcard 24. The firmware provisioning toolchain calculates DSS (shared secret between key pairs on the smartcard and on IC 18) and uses DSS to encrypt the preliminary firmware decryption key (PFDK).

To ensure that only valid ICs can participate in the shared secret computation for firmware provisioning, the UID for each IC needs to be verified. The UID can either be protected explicitly by a signature 36 generated by the IC manufacturer or implicitly by adding an additional key pair (PK) into the key agreement that is kept secret by the IC manufacturer so that only the IC manufacturer is able to generate key pairs for both sides of the key agreement. The verification of the toolchain key pairs is of lower importance but can be done in a similar way either using a signature on the public key or adding an additional key pair. If the IC manufacturer generated key pair is diversified by the device manufacturer, the resulting public value will have to be sent to the IC manufacturer for signing.

In more detail, in the case of elliptic curve Diffie-Hellman, the IC manufacturer chooses public system parameters such as a large prime p, an elliptic curve $E(\mathbb{Z}_p)$ of order n (prime), and a generator $G \in_R E(\mathbb{Z}_p)$. An elliptic curve private key $KDD \in_R \mathbb{Z}_n$ is inserted into each IC by the IC manufacturer. The matching public key is then $UID := KDD \cdot G$. The device manufacturer receives key pair MCP, MDP that can be diversified for each contract manufacturer using additional key pair CCP, CDP. After verifying the UID of the IC the firmware provisioning toolchain will calculate DSS using the formula $DSS := MCP \cdot CCP \cdot UID$, encrypt the firmware decryption key using a symmetric encryption algorithm (e.g. AES), and send the encrypted key to the device together with its public intermediate Diffie-Hellman value $CUID := MDP \cdot CCP$. On each device, the IC will calculate the same shared secret $DSS := KDD \cdot CUID$ and decrypt the firmware decryption key so that the device will be able to decrypt the provisioned firmware. Typically, the shared secret is not directly used as a key. Typically, a key for use with a symmetric encryption algorithm is derived from the shared secret by using a key derivation function KDF. That is, $DSS := KDF(KDD \cdot CUID))$ where KDD is the elliptic curve private key. In another embodiment, if an additional key pair (PK), kept secret by the IC manufacturer, is used for implicit verification of the key pairs of the shared secret calculation, the formulas for the public values UID and MDP need to be modified, where $$UID := KDD \cdot (PK \cdot G), \text{ and } MDP := MCP \cdot (PK \cdot G).$$

Figure 2:
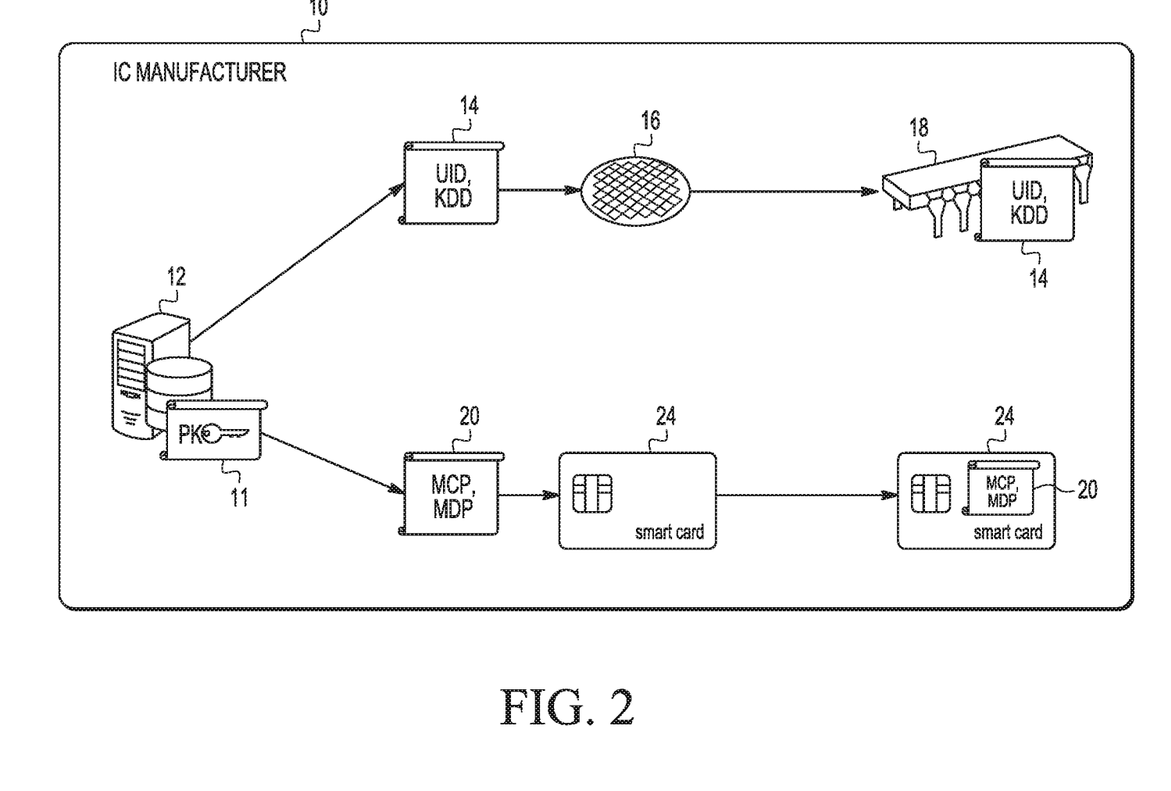
FIG. 2 illustrates the IC manufacturing environment portion of the method of FIG. 1 in more detail.

FIG. 2 illustrates a portion of the method of FIG. 1, relating to IC manufacturing environment 10, in more detail. In one embodiment, a private key pair (PK) is kept secret by the IC manufacturer and may be used to protect the generation of the shared secret generation parameters for the manufactured ICs and for secure memory 24 so that only the IC manufacturer is able to generate valid parameters for the shared secret calculation. The KDD and UID 14 are inserted into each die of wafer 16 during wafer testing. Also, on smartcard 24, firmware provisioning toolchain parameters 52 are configured to include initial secrets such as a MCP and MDP key pair. A plurality of IC die are singulated from wafer 16, packaged, and tested. The completed ICs, such as IC 18, are provided to contract manufacturing environment 30. Smart card 24 is provided to the IoT device manufacturer.

Figure 3:
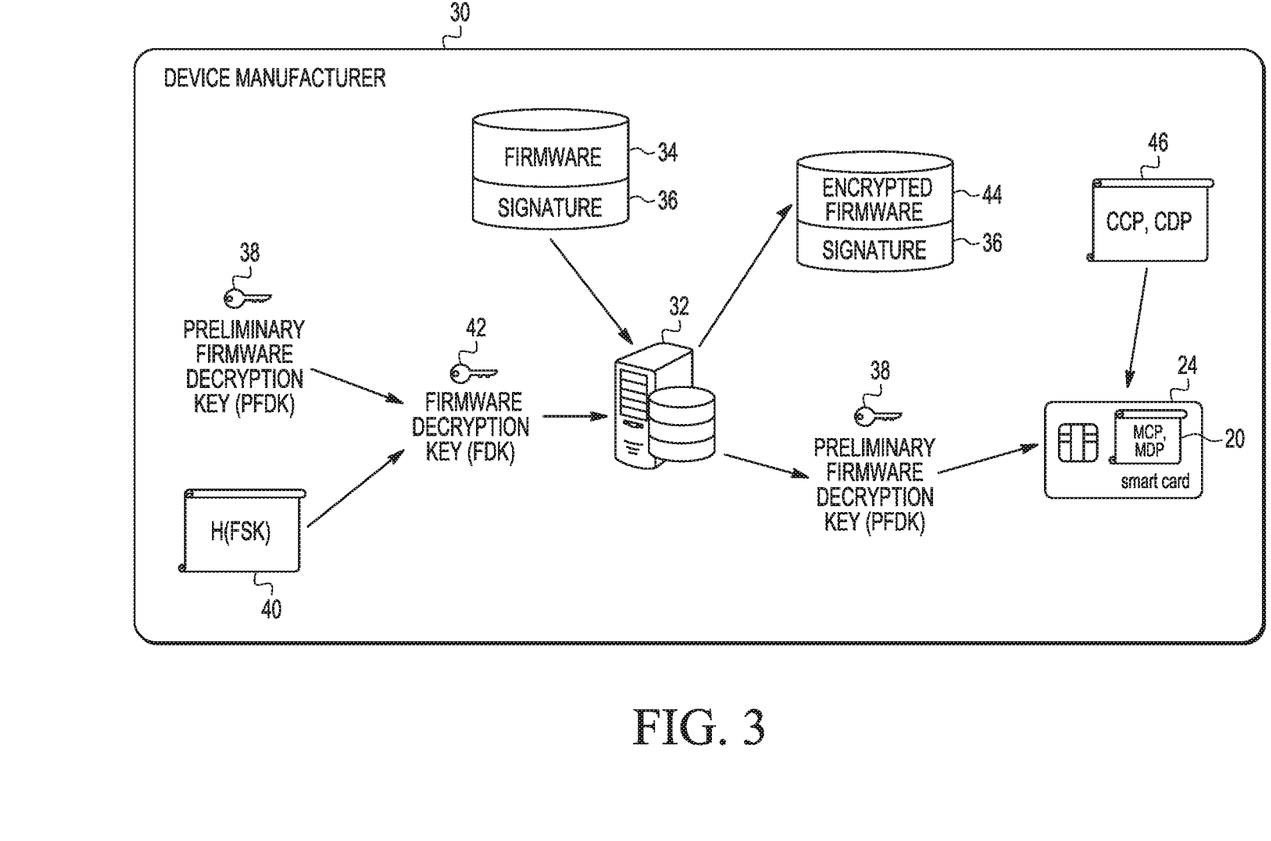
FIG. 3 illustrates the IoT device manufacturing environment portion of the method of FIG. 1 in more detail.

FIG. 3 illustrates IoT device manufacturing environment 30 of the method of FIG. 1 in more detail. In FIG. 3, preliminary firmware decryption key (PFDK) 38 is combined with the hash of the firmware signature verification key (FSK) 40, or the firmware signature verification key, to produce firmware decryption key (FDK) 42. Firmware decryption key 42, firmware 34, and signature 36 are provided to server 32. Firmware 34 is encrypted to produce encrypted firmware 44, and encrypted firmware 44 and signature 36 are then provided to for upload IoT device 58 as illustrated in FIG. 1. Also, PFDK 38 is uploaded to smart card 24.

Whenever there is a firmware image to be provisioned to manufactured IoT device 58, the IoT device manufacturer encrypts and signs the firmware image that the contract manufacturer is supposed to provision to the manufactured devices. This is only done once for a given firmware version as the devices of the same model all run the same firmware and would not benefit from a device specific firmware image encryption. To the contrary, encrypting the same image with many different keys could even help attackers to break the encryption.

The basic scheme simply uses a static symmetric FDK or PFDK put on the smartcard before delivering the smartcard to the contract manufacturer. This has the disadvantage that either the same key would have to be used for different firmware versions or a new smartcard would have to be configured and delivered to the contract manufacturer each time a new firmware version is created. In another embodiment, the FDK or PFDK is delivered together with the firmware image in encryption form. The firmware decryption key is then encrypted specifically for the contract manufacturer via the smartcard by the IoT device manufacturer. Only the firmware provisioning toolchain will be able to decrypt the firmware decryption key and re-encrypt it using the shared secret between the key pairs on the toolchain and IC 18 inside IoT device 58. For encrypting the FDK or PFDK for the smartcard, a static symmetric key stored on the smartcard by the IoT device manufacturer may be used. In another embodiment, a shared secret DSS, shared between key pairs on the smartcard and a key pair chosen by the IoT device manufacturer, is used for encrypting the FDK or PFDK.

In another embodiment, a further encryption level may be introduced into the method by encrypting the key used to encrypt the firmware decryption key. The additional firmware key decryption key is provided to IC 18 so that each firmware image could use a new encryption key but still be decrypted by the IoT device without having to redo the firmware provisioning process. This could then be used for protecting software updates in the field in addition to provisioning firmware during manufacturing. An alternative solution with similar properties is to derive a firmware encryption key using a key agreement between two asymmetric key pairs. The private key from one of these pairs is then encrypted specifically for the firmware provisioning toolchain and provided to IC 18 instead of the symmetric key. A shared secret between this private key and the public key from the other key pair can then be used for encrypting the firmware decryption key. However, the simplest solution for encrypting the firmware decryption key is to include a static symmetric key inside the firmware provisioning toolchain. Another more flexible option is to use a key agreement, similar to the one between IC 18 and toolchain 52, between a key pair chosen by the IoT device manufacturer and one or more key pairs of firmware provisioning toolchain parameters 52. An additional security measure for provisioning the firmware is the verification of the security configuration of the manufactured device, especially a configuration of a root of trust for secure boot and the debug settings, for encryption of a memory element, and a modification of a device configuration. Since the configuration of these critical settings is the responsibility of untrusted contract manufacturers, a malicious contract manufacturer could, for example, use a device with full debug access to extract the firmware decryption key or the firmware itself. To prevent this kind of manipulation, a cryptographic hash of the FSK, used by the device manufacturer to sign its device firmware, is used as a parameter for a key derivation function used by the device manufacturer to calculate the FDK from a PFDK. Instead of providing the real firmware decryption key, the PFDK is included with firmware provisioning toolchain parameters 52 on smartcard 24 and from there to the IC. Other security critical parameters (e.g. debug settings, settings enabling security functions) could be hashed and used as a parameter for the key derivation function as well. An example formula for deriving the FDK is given by FDK := KDF(PFDK, hash(FSK)), but any other way for deriving the FDK from the PFDK and a combination of device security parameters is possible as well. Also, as mentioned above, a similar scheme for protecting device security parameters could be integrated into the derivation of the symmetric encryption key for encrypted transfer of the FDK from the smartcard to the IC, for example, using the formula DSS := KDF(KDD·CUID, hash(FSK)).

To protect against reverting the device configuration, state fuses could be used for the hash of the FSK and other settings. Further protection could be achieved by preventing access to the initial key pair inserted by the IC manufacturer by any other means than unmodifiable code, such as a read only memory (ROM), inside the IC. Devices that are incorrectly configured by the untrusted third parties will not be able to calculate the same firmware decryption key as the IoT device manufacturer used during encryption of the firmware, so provisioning of the firmware will fail. An alternative implementation could use the hash firmware verification key and other security parameters in the derivation of the shared secret with the toolchain so the decryption of the firmware decryption key would fail if the IC was not configured correctly.

In another embodiment, protected firmware provisioning is used to prevent overproduction by contract manufacturers. For example, if a protected hardware, such as a smart card or an HSM, is used for protecting the secrets of the firmware provisioning toolchain, implementing additional production control is possible by simply counting the number of devices provisioned by the toolchain until a limit is reached.

The method for provisioning firmware in the described embodiments provides a secure approach to protect the confidentiality and integrity of firmware during manufacturing of an IoT device in an unsecure environment that uses un-customized "off-the-shelf" ICs. The method also keeps provisioned firmware confidential from distributors, contract manufacturers, competitors and even the IC manufacturer. In addition, this approach does not require a live internet connection that could lead to production interruptions and does not require a secured environment at contract manufacturing, thus making it easy to integrate into typical manufacturing processes. Additionally, all operations required on the IC or device itself are feasible on very resource constrained devices which is especially useful for the IoT market. Additionally, it prevents firmware provisioning to devices with invalid security configuration and tampering by untrusted contract manufacturers as well as allowing the IoT device manufacturer to tightly control which and how many devices are produced.

Since the firmware provisioning toolchain contains only secrets that are specific for a particular IoT device manufacturer and a particular contract manufacturer, and the firmware image is specifically encrypted for a specific toolchain, any extracted or leaked secret does not allow an attacker to decrypt firmware encrypted by another device manufacturer or encrypted for another contract manufacturer. The IC only contains IC specific key material, so extracted secrets from one IC does not help an attacker to break the protection for other ICs as long as he does not have access to a smart card and a matching firmware image for a specific contract manufacturer as well.

The method is flexible and may be adapted for different needs of IoT device manufacturers, e.g., multiple firmware images encrypted with different keys can easily be supported. Also, different types of keys and algorithms can be used, or the method may be adapted to different strategies for updating keys.

Various embodiments, or portions of the embodiments, may be implemented in hardware or as instructions on a non-transitory machine-readable storage medium including any mechanism for storing information in a form readable by a machine, such as a personal computer, laptop computer, file server, smart phone, or other computing device. The non-transitory machine-readable storage medium may include volatile and non-volatile memories such as read only memory (ROM), random access memory (RAM), magnetic disk storage media, optical storage medium, flash memory, and the like. The non-transitory machine-readable storage medium excludes transitory signals.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for secure firmware provisioning of a device, the method comprising:
   manufacturing, by a first entity, an integrated circuit (IC) for use in the device;
   providing the IC to a second entity for manufacturing the device using the IC, the IC having a unique identifier (UID) and secret key derivation data (KDD);
   providing a secure memory to a third entity, the secure memory having a first key pair, the secure memory being used with a firmware provisioning toolchain of the second entity;
   storing a device configuration parameter in the secure memory, the device configuration parameter arranged to be used for generation of a first shared secret for encrypting the firmware decryption key in the secure memory; and
   storing the device configuration parameter in the IC, the device configuration parameter arranged to be used for generating a second shared secret for use in decrypting the firmware decryption key in the IC,
   wherein during the manufacturing of the device by the second entity, the secure memory being enabled to verify the IC by verifying the UID, the secure memory being enabled to store a firmware decryption key, the secure memory being enabled to encrypt the firmware decryption key, the encrypted firmware decryption key being provided to the IC, and the IC enabled to decrypt the encrypted firmware decryption key for use by the IC in decrypting the firmware.

2. The method of claim 1, wherein the third entity is an internet of things (IoT) device manufacturer and the second entity is a contract manufacturer contracted to manufacture the device for the third entity, wherein the device is characterized as being an IoT device.

3. The method of claim 1, further comprising:
   enabling storage of a preliminary firmware decryption key (PFDK) on the secure memory;
   enabling encrypted transfer of the PFDK to the IC from the secure memory;
   enabling receipt of a device configuration parameter arranged to be used as an input parameter for derivation of the firmware decryption key from the preliminary firmware decryption key on the IC; and
   enabling storage of the device configuration parameter inside the IC;
   wherein the device configuration parameter is used in the device for one or more of storage of a firmware signature verification key (FSK), enabling or disabling a debug mode, enabling or disabling a secure boot, enabling or disabling encryption of a memory element, and enabling or disabling a modification of a device configuration.

4. The method of claim 3, further comprising:
   using the FSK to verify the firmware for the device;
   enabling storage of the FSK on the IC; and
   using the FSK as an input parameter for deriving a second firmware decryption key from the PFDK on the IC, the second firmware decryption key the same as the firmware decryption key.

5. The method of claim 1, wherein the KDD is characterized as being an elliptic curve private key and the shared secret is generated using elliptic curve Diffie-Hellman.

6. The method of claim 1, wherein storing of the device in the IC further comprises burning fuses in the IC for storing the device configuration parameter.

7. The method of claim 1, further comprising:
   using a firmware signature verification key (FSK) to verify the firmware for the device;
   enabling storage of the FSK on the IC and the secure memory;

using the FSK as an input parameter for generating a shared secret;
encrypting the firmware decryption key inside the secure memory using the shared secret to produce an encrypted firmware decryption key; and
decrypting the encrypted firmware decryption key using the shared secret.

8. The method of claim 1, wherein the secure memory is characterized as being one of a smartcard or a hardware security module (HSM).

9. The method of claim 1, further comprising:
digitally signing, by the first entity, the UID to produce a signature; and
enabling the secure memory to verify the UID by verifying the signature.

10. A method for secure firmware provisioning in a device, the method comprising:
manufacturing, by a first entity, an integrated circuit (IC) for use in the device;
providing the IC to a second entity for manufacturing the device using the IC, the IC having a unique identifier (UID) and secret key derivation data (KDD); and
providing a secure memory to a third entity, the secure memory having a first shared secret generated from the UID and KDD, the secure memory being used as part of a firmware provisioning toolchain of the second entity, the secure memory having a first key pair, the first key pair including a manufacturer configuration parameter (MCP) and a manufacturer diversification parameter (MDP), the first key pair used to generate the first shared secret;
wherein the secure memory being used by the second entity during the manufacturing of the device to verify the IC by verifying the UID, and for encrypting a firmware decryption key using the first shared secret, wherein the secure memory is enabled to receive a second key pair provided by the third entity before the secure memory is received by the second entity, wherein the secure memory is enabled to receive an encrypted firmware decryption key and a public key; and wherein the secure memory is enabled to decrypt the encrypted firmware decryption key using the second key pair and the public key, the firmware decryption key being encrypted again for transfer to the IC, and
wherein the firmware provisioning toolchain providing the encrypted firmware decryption key to the IC, the IC being enabled by the first entity to decrypt the encrypted firmware decryption key using a second shared secret, the second shared secret generated using a public key and the KDD, wherein the second shared secret is the same as the first shared secret, and the firmware decryption key is used for decrypting encrypted firmware in the IC.

11. The method of claim 10, wherein the secure memory is enabled to receive and store a symmetric key for decrypting the encrypted firmware decryption key, the firmware decryption key being encrypted again for transfer to the IC.

12. The method of claim 10, wherein the third entity is an internet of things (IoT) device manufacturer, the second entity is a contract manufacturer contracted to manufacture the device for the third entity, wherein the device is characterized as being an IoT device.

13. The method of claim 10, further comprising:
enabling storage of a preliminary firmware decryption key (PFDK) on the secure memory;
enabling encrypted transfer of the PFDK to the IC from the secure memory;
enabling receipt of a device configuration parameter arranged to be used as an input parameter for derivation of the firmware decryption key from the preliminary firmware decryption key on the IC; and
enabling storage of the device configuration parameter inside the IC;
wherein the device configuration parameter is used in the device for one or more of storage of a firmware signature verification key (FSK), enabling or disabling a debug mode, enabling or disabling a secure boot, enabling or disabling encryption of a memory element, and enabling or disabling a modification of a device configuration.

14. The method of claim 13, further comprising:
using the FSK to verify the firmware for the device;
enabling storage of the FSK on the IC; and
using the FSK as an input parameter for deriving a second firmware decryption key from the PFDK on the IC, the second firmware decryption key the same as the firmware decryption key.

15. The method of claim 10, wherein the UID is determined using the KDD and a private key known only to the first entity.

16. The method of claim 10, wherein the secure memory is characterized as being one of a smartcard or a hardware security module (HSM).

* * * * *